UNITED STATES PATENT OFFICE.

MICHAEL BRYLAWSKI, OF PHILADELPHIA, PENNSYLVANIA.

IMPROVEMENT IN COMPOSITIONS FOR WATER-PROOFING AND STIFFENING FABRICS.

Specification forming part of Letters Patent No. 151,834, dated June 9, 1874; application filed March 2, 1874.

*To all whom it may concern:*

Be it known that I, MICHAEL BRYLAWSKI, of Philadelphia, Pennsylvania, have invented a Composition for and Process of Water-Proofing and Stiffening, of which the following is a specification:

The object of my invention is to water-proof and stiffen cloth and felt, by treating the same with a composition composed of gum-shellac, alcohol, and linseed-oil.

In carrying out my invention, I prefer to compound the several ingredients in about the following proportions: Shellac varnish, one and a half gallon; alcohol, one gallon; boiled linseed-oil, one a half pint.

In preparing the varnish a sufficient quantity of gum-shellac is dissolved in alcohol to produce one and a half gallon of a weight of three and a half pounds. The varnish thus prepared is diluted with one gallon of alcohol, and the boiled linseed-oil is then added, and thoroughly mixed in, by stirring or otherwise, all of the ingredients being cold. The composition is next permitted to stand for five or six hours, in order that a perfect union of the oil with the other ingredients may be effected, after which it is ready for use.

The cloth or felt to be treated is simply dipped into or otherwise saturated with the composition, and is then subjected to the action of appropriate rollers, by which the superfluous liquid is expressed, this latter operation having also the effect of spreading the composition uniformly over and through the fabric. After leaving the rollers, the cloth or felt is hung up to dry, which will require about eighteen hours, and is then ready for use in the manufacture of hats and caps, over-gaiters, &c.

The cloth may be made more or less stiff by increasing or decreasing the quantity of shellac or oil in proportion to the alcohol.

I claim as my invention—

1. A composition for water-proofing and stiffening cloth and felt, consisting of shellac, alcohol, and linseed-oil combined, in the proportions specified.

2. The saturating and expressing process described of applying the composition.

In testimony whereof I have signed my name to this specification in the presence of two subscribing witnesses.

M. BRYLAWSKI.

Witnesses:
WM. A. STEEL,
HARRY SMITH.